AUTOMATIC TELEPHONE SYSTEM WITH BI-DIRECTIONAL CONNECTION STAGE

Filed Dec. 2, 1965

INVENTORS
PIERRE MORGAND
YVES RIOU
BY Edwin E. Greigg
ATTORNEY

INVENTORS
PIERRE MORGAND
YVES RIOU
BY [signature]
ATTORNEY

Oct. 13, 1970 P. MORGAND ET AL 3,534,173

AUTOMATIC TELEPHONE SYSTEM WITH BI-DIRECTIONAL CONNECTION STAGE

Filed Dec. 2, 1965 9 Sheets-Sheet 3

INVENTORS
PIERRE MORGAND
YVES RIOU
BY Edwin E. Greigg
ATTORNEY

INVENTORS
PIERRE MORGAND
YVES RIOU
BY
ATTORNEY

INVENTORS
PIERRE MORGAND
YVES RIOU
BY Edwin E. Greigg
ATTORNEY

INVENTORS
PIERRE MORGAND
YVES RIOU
BY
[signature]
ATTORNEY

INVENTORS
PIERRE MORGAND
YVES RIOU
BY Edwin E. Greigg
ATTORNEY

INVENTORS
PIERRE MORGAND
YVES RIOU
BY
ATTORNEY

INVENTORS
PIERRE MORGAND
YVES RIOU
BY Edwin E. Greigg
ATTORNEY

United States Patent Office 3,534,173
Patented Oct. 13, 1970

3,534,173

AUTOMATIC TELEPHONE SYSTEM WITH BI-DIRECTIONAL CONNECTION STAGE

Pierre Morgand, Morsang-sur-Orge (Essonne), and Yves Riou, Paris, France, assignors to C.I.T.-Compagnie Industrielle des Telecommunications, Paris, France, a corporation of France Filed Dec. 2, 1965, Ser. No. 511,060
Claims priority, application France, Dec. 2, 1964, 997,124; Dec. 15, 1964, 998,714; Mar. 15, 1965, 9,237
Int. Cl. H04q 3/42
U.S. Cl. 179—18 7 Claims

ABSTRACT OF THE DISCLOSURE

An automatic telephone central system having multiple connections of a plurality of stages in a centralized control having a connecting circuit for automatically establishing connections in which only a single operation is necessary to establish a connection between two subscribers, the input connection stages being used both for the input communication and for the output communication, the input connection stages being followed by a two-directional connection stage.

The invention relates to an arrangement having a reduced number of components for a telecommunication central office, the arrangement being capable of ensuring a given traffic between subscribers connected directly or not to the central office without affecting the quality of service. More particularly, the present invention applies to telecommunication central office of the Crossbar type, but may be easily adapted for a central office using other types of commutators. The means for adapting the so-called "conjugate selection" to a central office of the Crossbar type is known. According to this arrangement, two distinct test systems are provided, one for pre-selection and the other for selection. The function of the first system is to find a free path between the calling subscriber and the connection circuit, the function of the second system being to find a free path between the connection circuit and the called subscriber. This arrangement permits the reduction of the number of components in each of the systems, but does not, however, solve completely satisfactorily the problems presented by the "conjugate type selection" according to this arrangement. Although the selection to come is yet unknown, the calling subscriber's call is definitely engaged: in other words, the fact that there is a free path between the calling subscriber and the connection circuit does not necessarily mean that a free path will be found also between the connection circuit and the called subscriber. Thus the uncompleted call is therefore not impossible not withstanding the existence of free paths between the calling and called subscribers.

According to the present invention, the abovementioned drawback is eliminated by providing a single test system between the calling and called subscribers. Such a system makes possible the determination of all possible paths which may be followed to connect two subscribers. Should only one of this plurality of paths be free, the call can be put through. To this end, a central component is provided at the middle of the link chain and receives useful information from a "routing indicator" connected to a recorder which controls the application of a given polarity at each end of the system. It remains for this central component to scan systematically all the links through the test system. When a free link, corresponding to a free path, is found, one may be sure that the selection undertaken will result in the putting through of the call.

According to the invention, between the group of calling subscribers and the group of called subscribers (the latter group may be the same), only two selection stages are inserted: a "Caller Selection" stage which receives the whole of the outgoing leads of the subscribers' groups and a "Called Subscriber Selection" stage provided with the whole of the incoming leads towards the subscribers' groups, the two selection stages being so interconnected that any path leads to any subscriber.

According to the invention, the organization of the selection circuit and the interconnection of the leads making up the marking network enable integral conjugate selection, i.e. that the scanning effected by the central path finding equipment always permits to know whether a path is free between a given called and a given calling subscribers; it is not necessary to select a scanning group, each lead is able to indicate in the same way whether the path which it represents is free. The first lead which is found to be free therefore indicates that connection is possible. Due to the part which it plays, each lead is called a "selection guide." The selection is effected for the whole central office, all subscribers having access to each group of selectors for a calling subscriber selection as well as for a called subscriber selection. For practical purposes, however, each calling or caller selection stage is made up of one or several "selection bays," also called "selection groups," each selection group itself comprising "selection sub-groups." It is, however, to be understood that each group or even, each sub-group, has the same chance of getting full access to a given subscriber, as regards calling subscriber selection as well as called subscriber selection.

According to the invention, each selector sub-group has access to all of the subscribers' groups of the central office through at least one of their (vertical) columns.

According to the invention, each (vertical) column of a given subscribers' group may be used as a "calling" or "called" line.

According to one embodiment of the invention, the calling and called subscribers' selection stages are so interconnected that any terminal of any group of the calling subscribers' stage may lead through the called subscribers' stage to any called subscriber of the central office.

Moreover, the calling and called subscribers' selection stages are so interconnected that the various columns of a same sub-group of callers are linked to the columns of the various sub-groups of called subscribers belonging to the same group. It is thus clear that for each pair of corresponding selection sub-groups, there exist a possible way between two subscribers, one calling and the other being called, both belonging to the same subscribers' group. It may, however, happen that, in a selection group comprising several subgroups, all the links between the only calling sub-group to which the caller may have access because of the busy condition of the other columns of the calling subscribers' group and the only called sub-group having access to the called subscriber due to the busy condition of the other columns of the called subscribers' group be unavailable, in spite of the fact that there exist free links between the corresponding called sub-group of the calling sub-group and the corresponding calling sub-group of the called sub-group.

According to a variant of the embodiment of the invention, the interconnection arrangement between the "calling" subscribers' selection stage and the "called" subscribers' selection stage comprises means for eliminating the fictitious busy condition of the selection group; such means comprise an interconnection arrangement permitting the use of the free lead from the called to the caller in the reverse direction that is in the direction caller-called.

According to one feature of the invention, this interconnection arrangement includes a change-over device which reverses the input and output connections of the supply bridge inserted in the link, such an arrangement making it possible to double the connecting capacity of the selection group. As mentioned above, the calling and called subscribers' selection stages are so interconnected that the various columns of a same calling sub-group are linked to the columns of the various called sub-groups belonging to the same group. Thus, for each pair of corresponding selection groups, there exists a possible path between two subscribers, one calling, the other called both belonging to the same subscribers' group; in addition, since in that case the connection is made from the same column, it is certain that the call which would be thus placed would short-circuit the supply bridge and could not materialize.

To avoid this and to enable a successful call between two subscribers belonging to the same group, one may use a device forbidding the hunting for the way to be avoided in some cases, for instance in the case of a local call when both subscribers belong to the same group, although said way must be usable for other calls where such a risk of short circuit is not be be feared. Such a way must therefore be possibly submitted or not, at will, to the hunting equipments. This is achieved by providing for two detection saturable magnetic core means assigned to each calling subscribers' sub-group and two detection saturable magnetic core means assigned to each called subscribers' sub-group: one of these cores is more particularly ear-marked for the way to be forbidden in some cases, the other cores being ear-marked for the ways which are always authorized. It is then easy for the "routing indicator" which knows the calling and called subscribers' groups to cancel the operation of the cores the signalled way of which will not be used.

Moreover, when there exist special services and automatic toll outgoing links towards other central offices, the called subscribers' selection stage is divided into several selection bunches having access respectively to the local subscribers, special services and called subscribers connected to other central offices, adapted supply bridges being inserted between the calling subscribers' stage and the called subscribers' selection bunches. A similar arrangement to that of the local called subscribers is provided for in order to handle the traffic of the automatic toll incoming circuits, so that the latter may be directed either towards the automatic toll outgoing circuits as far as through traffic is concerned or towards the local called subscribers as far as the incoming traffic is concerned. According to such arrangements, the incoming circuits are, therefore, connected to the calling subscribers' selection stage and outgoing circuits to the called subscribers' selection stage.

To help in the formation of selection sub-groups, a distribution frame is interposed between the subscribers' groups and the local selection stages as well as between the circuits and the circuit selection stages.

In an arrangement comprising only two selection stages, i.e. a calling subscribers' selection stage and a called subscribers' selection stage, each stage being directly connected to all of the subscribers' groups, the supply bridge being located between the calling subscribers' stage and the called subscribers' stage, a column of a subscribers' group being usable for calling or called purposes, the local chain between two subscribers presents a perfect symmetry with regard to the supply bridge. The same does not apply to the equipments which prepare the call, where the most centralised component, i.e. the routing indicator, does not perform a balanced function since by reason of its being directly connected to the called subscribers' group, it is connected to the calling subscribers' group only through an assembly of registers and register finders, the assembly of registers being accessible to any group of subscribers. The respective functions performed by the register and the routing indicator make it necessary for them to exchange information; actually, to perform its main function which consists in controlling the routing of the call towards the final selection, the register calls upon the routing indicator. The latter, after receiving from the register the called subscriber's number, transmits to the register all necessary data for the routing; outgoing or local route, called subscriber's condition and category, essential data for the selections, etc. The register, which must be provided with the necessary storage capacity for recording all these data, proves therefore to be a costly equipment, due both to its complexity and to the relatively great number of units which are necessary. The routing indicator remains associated with the register only during a short time for each call; it may, therefore, serve a great number of registers and consequently, only a small number of such routing indicators will be necessary.

It is to be noticed that in the organisation described above, the register receives from the calling subscriber's line only the called subscriber's number, all the other data being supplied to it by the routing indicator. Besides, the centralization of the assemblies of registers and register-finders results in rather a heavy plant. In order to meet these various requirements, according to one feature of the invention, a reduced number of registers are assigned to each group of subscribers.

Other features and advantages of the invention will become apparent from the following detailed description which will be better understood by aid of the accompanying drawings, in which.

Figure 1:
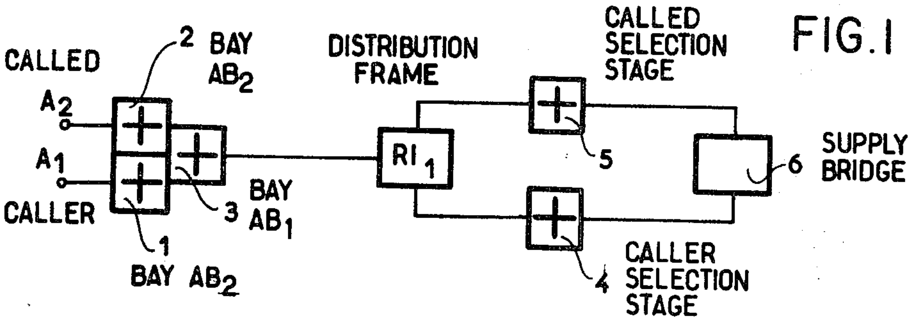
FIG. 1 shows the diagram of the principle of the invention.

The diagram according to FIG. 1 shows the basic structure of the organisation of a central office according to the invention. The switches are preferably of the Crossbar type. Each switch comprises a certain number of inputs or columns and of outputs or rows, the output being placed cross-wise over the inputs. All calls are assumed to be local. $A_1$ is, for instance, a calling subscriber, $A_2$ a called subscriber. The squares 1 and 2 symbolize the bays $AB_2$, i.e. the bays the outputs of which are connected to the subscribers' equipment, while square 3 symbolizes the bays $AB_1$, the rows of which are connected to the columns of bays $AB_2$, and the columns of which are connected through a distribution frame $RI_1$ to a calling subscribers' selection stage 4 and to a called subscribers' selection stage 5. Generally, the subscribers as a whole are divided into subscribers' group having a fixed capacity, a group of subscribers being then made up of several selection multpiles, each of which comprises two bays $AB_2$ and one bay $AB_1$ with each group being provided with a line switching frame. The outputs of all bays $AB_2$ of a same subscribers' group are multipled together while the columns of the corresponding bays $AB_1$ go out individually towards the distribution frame $RI_1$. The calling subscribers' stage 4 comprises a certain number of bays, each bay comprising a certain number of sub-groups and each sub-group having access, on the one hand, to all of the subscribers' groups of the central office through at least one of their columns, and, on the other hand, to all sub-groups of the same bay of the called subscribers' selection stage 5. The called subscribers' selection stage 5 is organized symmetrically to the calling subscribers' selection stage. Each output of a called subscribers' selection sub-group has access to a subscribers' group through at least one of its columns, the sub-group itself having access to any called subscriber of the central office. An ideal distribution is thus achieved at the selection stage. Between stages 4 and 5, i.e. at the middle-point of the calling-to-called subscribers' circuit, is arranged a call supply bridge 6.

Figure 2:
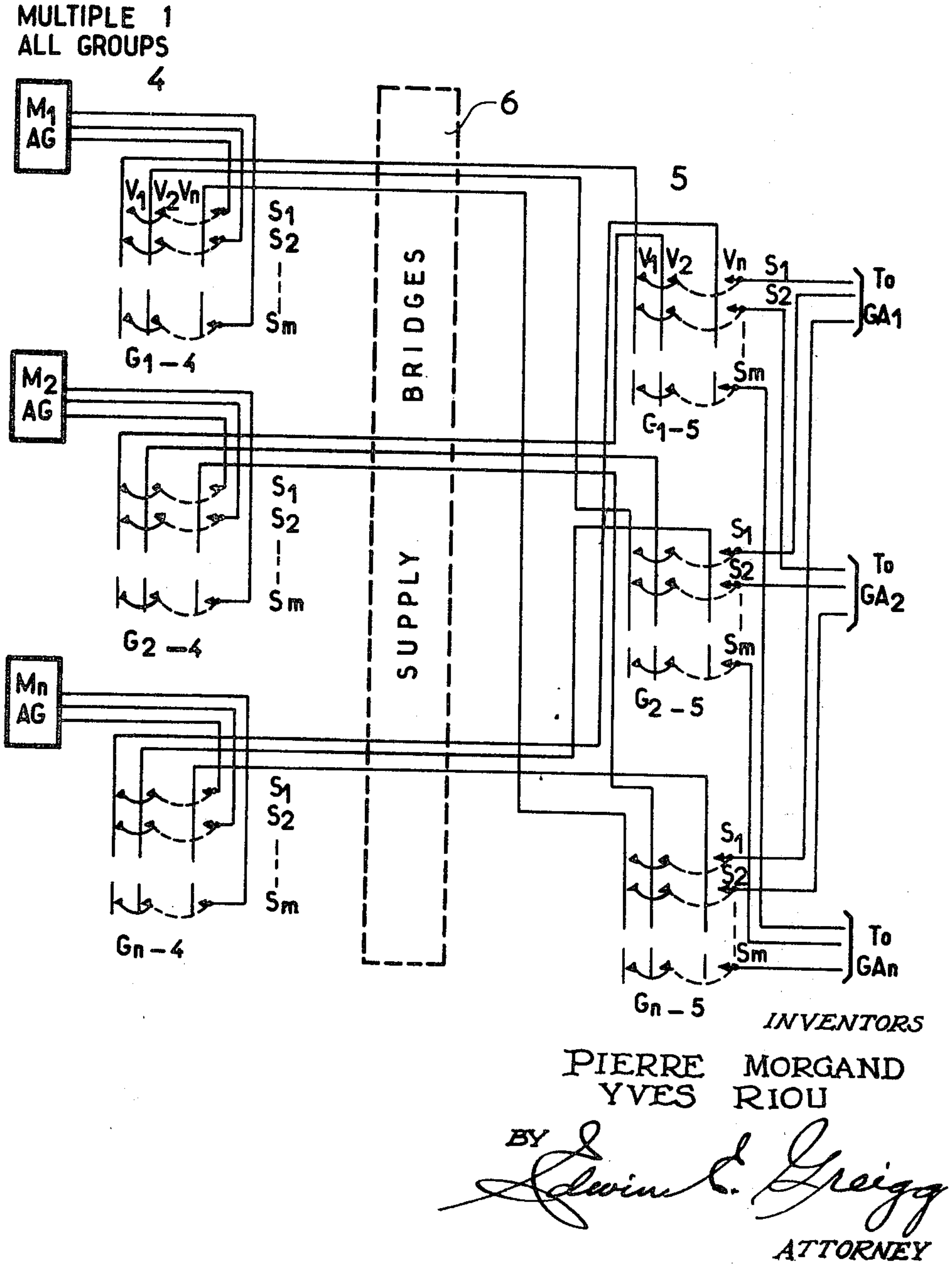
FIG. 2 shows the principle of the interconnection according to the invention, between calling and called subscribers' stages.

FIG. 2 shows a first embodiment of the circuit making up the interconnection between the calling subscribers' selection stage 4 and the called subscribers' selection stage 5 within a same bay. Each of stages 4 and 5 is made of $n$ selection sub-groups $G_1, G_2 \ldots G_n$, each of which comprises $m$ outputs $S_1, S_2 \ldots S_m$. In group $G_1$ of stage 4, output $S_1$ is connected to a column of the first multiple of the first subscriber's group, output $S_2$ is connected to a column of the first multiple of the second subscribers' group, output $S_m$ is connected to a column of the first multiple of the $m$th subscribers' group; in group $G_2$, output $S_1$ is connected to a column of the second multiple of the first subscribers' group, output $S_2$ is connected to a column of the second multiple of the second subscribers' group, etc., output $S_m$ is connected to a column of the second multiple of the $m$th subscribers' group. These connections have been represented on the left hand part of FIG. 2 by the squares esignated by $M_nAG$ that is the $n$th multiple of all groups. The same applies to group $G_n$, where output $S_1$ is connected to a column of the $n$th multiple of the first subscribers' group, etc. The connections between the calling subscribers' selection stage 4 and the called subscribers' selection stage 5 are effected as follows: each calling subscribers' selection group such as $G_1$ is connected from one column to another to all the called subscribers' selection sub-groups of the same bay. Thus, column $V_1$ of sub-group $G_1$–4 (4 designating the stage) is connected to column $V_1$ of $G_1$–5 (5 designating the stage), column $V_2$ of $G_1$–4 is connected to column $V_1$ of $G_2$–5, etc., and column $V_n$ of $G_1$–4 is connected to column 1 of group $G_n$ of stage 5. Columns $V_1, V_2 \ldots V_n$ of the selection sub-group $G_2$–4 are connected in a similar manner to that described for sub-group $G_1$–4 to columns 2 of the various sub-groups of stage 5 . . . and likewise for each of the sub-groups of stage 4. At stage 5, the outputs of each sub-group are distributed amongst the various subscribers' groups of the central office, designated by $GA_1, GA_2 \ldots GA_n$. More precisely, the output $S_1$ of the first sub-group $G_1$ goes towards a column of the first multiple of the first subscribers' group, output $S_2$ goes towards a column of the first multiple of the second subscribers' group $GA_2$, etc., and output $S_m$ goes towards a column of the first multiple of the $m$th subscribers' group ($GA_n$); for sub-group $G_2$, output $S_1$ goes towards a column of the second multiple of the first subscribers' group, output $S_2$ goes towards a column of the second multiple of the second subscribers' group, etc., output $S_m$ goes towards the column of the second multiple of the $m$th subscribers' group, etc., and likewise for sub-group $G_n$ where output $S_1$ goes towards a column of the $n$th multiple of the first subscribers' group, etc. (if it is assumed that the traffic requires $n$ selection units per subscribers' group). Thus the set-up of the calling subscribers' stage 4 towards the outgoing columns of the subscribers' groups and that of the called subscribers' stage 5 towards the incoming columns of the subscribers' groups are entirely symmetrical, it being understood that there has been no previous assignment for the columns of subscribers' bays $AB_1$, a same column being usable in the calling-to-called subscribers direction and conversely as mentioned above; denotations $M_1AG, M_2AG \ldots M_nAG$ designate the respective destination of the groups of wires of stage 4, multiple 1 of all the subscribers' groups for $M_1AG$, multiple 2 of all the subscribers' groups for $M_2AG$, etc.; denotations $GA_1, GA_2 \ldots GA_n$ of stage 5 designate the respective destinations of the wire groups, $GA_1$ for subscribers' group 1, $GA_2$ for subscribers' group 2, etc. It is thus seen that the group of wires towards $GA_1$ contains all the wires originating from outputs $S_1$ of the selection sub-groups of stage 5 and making for the various multiples of the same subscribers' group GA; likewise for $GA_2$–$GA_n$. It is clear that, according to this setup, any multpile of any subscribers' bay may reach through stages 4 and 5 any multiple of any subscribers' bay. The number of units shown in FIG. 2 corresponds to the number of columns making up each multiple with the subscribers' bays.

Figures 3, 5:
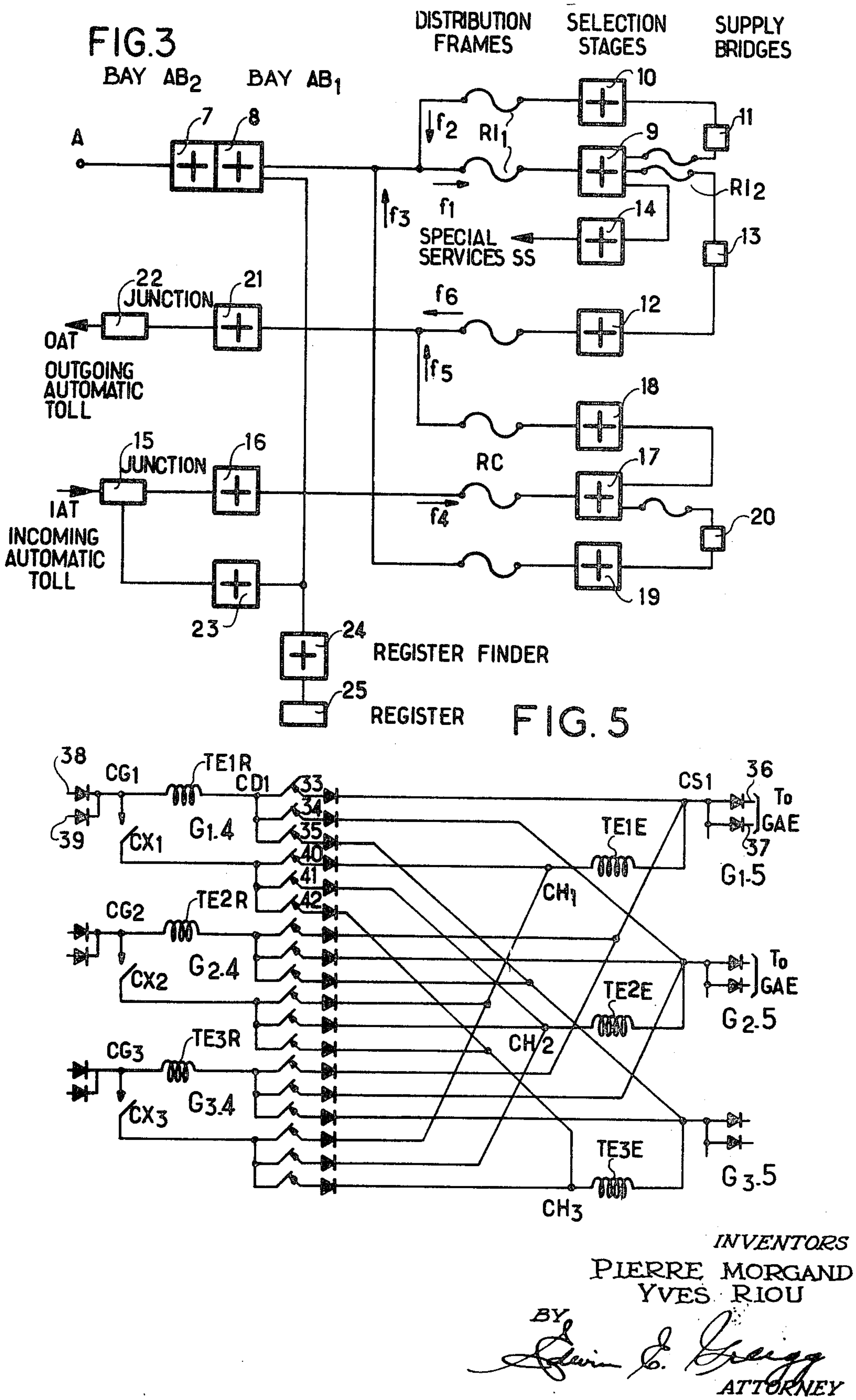
FIG. 3 shows the diagram of a central office having incoming and outgoing circuits, in addition to local subscribers.
FIG. 5 shows a partial schematical representation of selection guides in a selection group.

FIG. 3 shows the diagram of a central organised according to the invention and comprising local subscribers, incoming circuits and outgoing circuits, i.e. respectively from and to other central offices. Thus, there are three main chains, a local chain, an incoming-circuit chain and an outgoing-circuit chain.

In the local chain, subscribers A are connected to the outputs of bays $AB_2$ symbolized by square 7, bays $AB_2$ input columns being connected to bays $AB_1$ output rows symbolized by square 8. Bays $AB_1$ columns are double-purposed and may be used as "caller" (arrow $f_1$) or "called" (arrows $f_1$ and $f_3$); it is to be noticed that part of these columns may be assigned for pre-selection to achieve the connection between subscriber A and a register 25 through a register finder 24. When the subscriber communicates the called subscriber's number to the register, the selection is undertaken as soon as the called subscriber's full number is received by the register if the call is local, or as soon as the central office identification number is received in the case of an outgoing call. Calling subscriber's local calls therefore end up at the calling subscriber's selected stage symbolized by square 9. It has already been seen, in connection with FIG. 2 how that stage is organised for the case of only local traffic; here, as the traffic is not only local, the outputs of 9 will be arranged in several groups: it will be assumed, for instance, that half of the whole traffic goes through the called subscriber's selection stage 10 as far as local subscribers are concerned, one third being outgoing traffic and going towards stage 12, and one sixth of the traffic being directed towards special services through stage 14.

As there are different supply bridges according as the calls are local or outgoing, a distribution frame $RI_2$ makes it possible to insert at will the appropriate supply bridges 11 and 13. The number of necessary selectors for each of stages 10, 12 and 14 may thus be selected in accordance with the traffic data and the probability of permissible loss.

In the incoming-circuit chain, the automatic toll incoming-circuits IAT have junction devices individual to them such as 15 and are connected to circuit groups 16. The columns of these groups are connected to an incoming-circuit selection stage 17 through a circuit distribution frame RC. At the incoming circuit stage 17, similar operations to those performed at the calling subscriber's selection stage 9 are carried out, i.e. the incoming traffic (arrow $f_4$) is distributed amongst the transit stages 8 (arrow $f_5$) and the incoming call stages 19 (arrow $f_3$) following the known data. The connections are effected according to a similar principle to that of FIG. 2; it is, however, necessary at stage 17 to reserve some columns for the through and incoming traffic, as each selection sub-group of stage 17 must have access to any incoming circuit towards group 16 and to any destination of stages 18 and 19. The incoming circuit supply bridge 20 is located between stages 17 and 19.

All of the incoming circuit junction devices 15 have access to any free register amongst a central office register assembly 25 through a distribution group 23 and register finders 24.

In the outgoing circuit chain, the automatic toll outgoing circuits OAT provided with junction devices 22 individual to them, handle the outgoing traffic comprising, on the one hand, the local subscriber's out going traffic (arrow $f_6$) and, on the other hand, the through traffic originating from the incoming circuits IAT (arrow $f_5$). The junction devices 22 are connected to the outgoing circuit group 21 and the distributions and interconnections amongst group 21 and stages 12 and 18 are effected in such a way that any selection group of stages 12 and 18 has access to any direction connected to the outgoing circuit group 21. To this end, the interconnections are always carried out in a similar manner to that described at FIG. 2.

The general operation will now be described with reference to FIGS. 4, 5 and 6.

Following a subscriber's call, a connection is established between said subscriber and a register, said connection making use of one of the columns $AB_1$ especially reserved for the pre-selection circuit and the register finder. The register receives the called subscriber's number: if the called subscriber is a local one, the selection is undertaken directly upon receipt of the four digits, and if the called subscriber belongs to another central office, the selection is undertaken immediately upon receipt of the central office identification number. It will be assumed that the subscriber is local (FIG. 4). The register E calls the routing indicator IA and transmits the called subscriber's number to it; IA finds the subscriber's group to which the called subscriber belongs. The routing indicator IA then sets up a direct connection with the subscriber's group GAE through a distinct wire group, and the called subscriber's number is transmitted by means of marking wires; it is therefore possible to reach the called subscriber's level and to analyse his condition. The indication of that condition (free, busy or discriminated) is then sent to the routing indicator IA which has already supplied the register with the number of the called subscriber's bay. The routing indicator IA, which knows that the called subscriber is free, calls the condition indicator ID of the central office. A finder RIA of the routing indicator controls the latter through a wire and operates to energize a supply control relay CA.

A ground is thus provided at point D of wire 28 through contacts A and CA of the relays having the same denotations, which energizes relays $CA_1$ and $CA_2$ in the subscribers' bays and thus give the order to feed the layer of selection guides 29 and 30 between the calling and called subscribers. Resting contacts 31 represent the contacts of the free columns $AB_2$ and $AB_1$ of the calling subscribers' group GAR and the resting contacts 32 represent the contacts of the free columns $AB_1$ and $AB_2$ of the called subscribers' group GAE.

Figure 4:
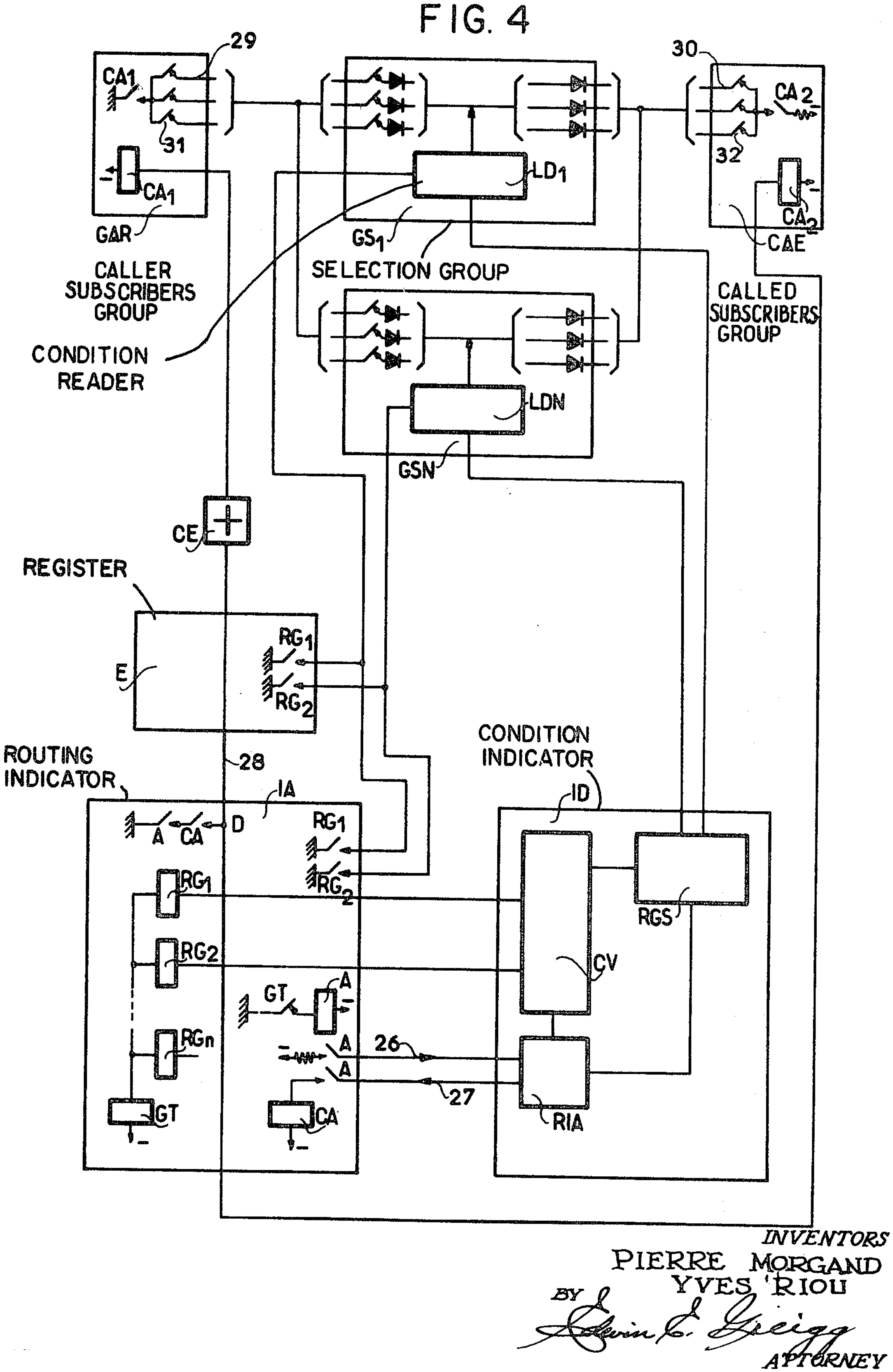
FIG. 4 is a schematical representation of marking in a central office according to the invention.

It has already been seen in FIG. 2 that each output of a calling subscribers' selection sub-group such as $G_1$–4 was connected to a column $AB_1$ of multiple $M_1$ of all the subscribers' group—the selection group $GS_1$ of FIG. 4 comprises a certain number of calling and called subscribers' selection sub-groups such as $G_1$–4, $G_2$–4 . . . and $G_1$–5, $G_2$–5 . . . $G_n$–5 (FIG. 2). It is the same for selection group $GS_n$ (FIG. 4). Each group $GS_1$, $GS_2$ . . . $GS_n$ is therefore connected through several columns to each subscribers' group GAR; the same applies on the called subscriber's side.

FIG. 5, which is a partial view of the selection guides in a selection group such as $GS_1$ helps in understanding the next steps of the operation.

The resting contacts 33, 34, 35, etc., belong to free columns of the selection sub-group $G_1$–4; a contact, 33 for instance, is connected through a rectifier to the various called subscribers' groups GAE to which the twenty outputs 36, 37 . . . of sub-group $G_1$–5 give access; the twenty inputs 38, 39 . . . originating from the calling subscribers' bays and making for the same calling subscribers' sub-group $G_1$–4 join up through a rectifier at a sub-group common point $CG_1$. To each selection sub-group corresponds a core made of quasi-rectangular hysteresis curve magnetic material comprises a winding such as TE1R inserted between the incoming point $CG_1$ and the common point $CD_1$ out going towards the various called subscribers' selection sub-groups such as $G_1$–5, $G_2$–5, $G_3$–5, etc.

Contacts 40, 41, 42, etc. belong to free columns of sub-groups $G_1$5, $G_2$–5, $G_3$–5, etc.; one recalls (see FIG. 2) that the columns between calling subscribers' selection sub-groups and called subscribers' selection sub-group are rigidly interconnected; the busy condition of a column of a calling subscribers' sub-group results in busying the column connected to it in one of the called subscribers' sub-group. A saturable core per selection sub-group comprises a winding such as TE1E for the first sub-group, TE2E for the second group, etc. The winding is inserted between the mutual point $CS_1$ of the various outputs to which selection sub-group $G_1$–5 gives access and the mutual point $CH_1$ connected to the columns of same row of the called subscribers' sub-groups. A connecting contact such as CX1 belongs to calling subscribers' sub-group $G_1$–4 and enables one to connect simultaneously the mutual point $CG_1$ to 10 cores TE1E, TE2E, TE3E . . . belonging to ten called subscribers' sub-groups connected with calling subscribers' sub-group $G_1$–4; the same applies for contact CX2 which connects the mutual point $CG_2$ to ten cores TE1E, TE2E, TE3E . . . pertaining to ten called subscribers' sub-groups connected with $G_2$–4, etc.

Thus, as the layer of selection guides has been fed through relays $CA_1$ and $CA_2$ at both ends of the layer, on the called and on the calling subscribers' sides, should there exist a free path between the calling and the called subscribers, a core, such as TE1R for instance, will carry a current (or several cores such as TE1R, TE2R, etc. will carry simultaneously a current). That current creates a certain inductance in the saturable core which passes from state 0 to state 1. The passing from state 0 to state 1 can be detected in each selection group such as $GS_1$ (FIG. 4) by a condition reader LD1. The various condition readers pertaining to the various selection groups are connected to a single finder RGS which indicates the selection group (or selection bay) in which there is a free path to put the call through. The condition reader then communicates to the routing indicator IA the records of the selection bay found by means of the relays RG (there are as many relays RG as selection bays). The routing indicator then make busy the signalled selection bay by applying a polarity through the appropriate contact ($RG_1$ for instance).

It will be assumed that selection bay $GS_1$ has been selected. The condition indicator ID operates to start the hunting for a called subscribers' sub-group having a free path amongst the 10 called subscibers' sub-groups belonging to bay $GS_1$. The condition reader LD1 operates to energize a quick-operating relay, the contact $CX_1$ of which connects to 10 cores TE1E, TE2E . . . TE10E associated with the called subscribers' sub-groups to the incoming common point $CG_1$ of the previously selected calling subscribers' sub-group (FIG. 5).

Figure 6:
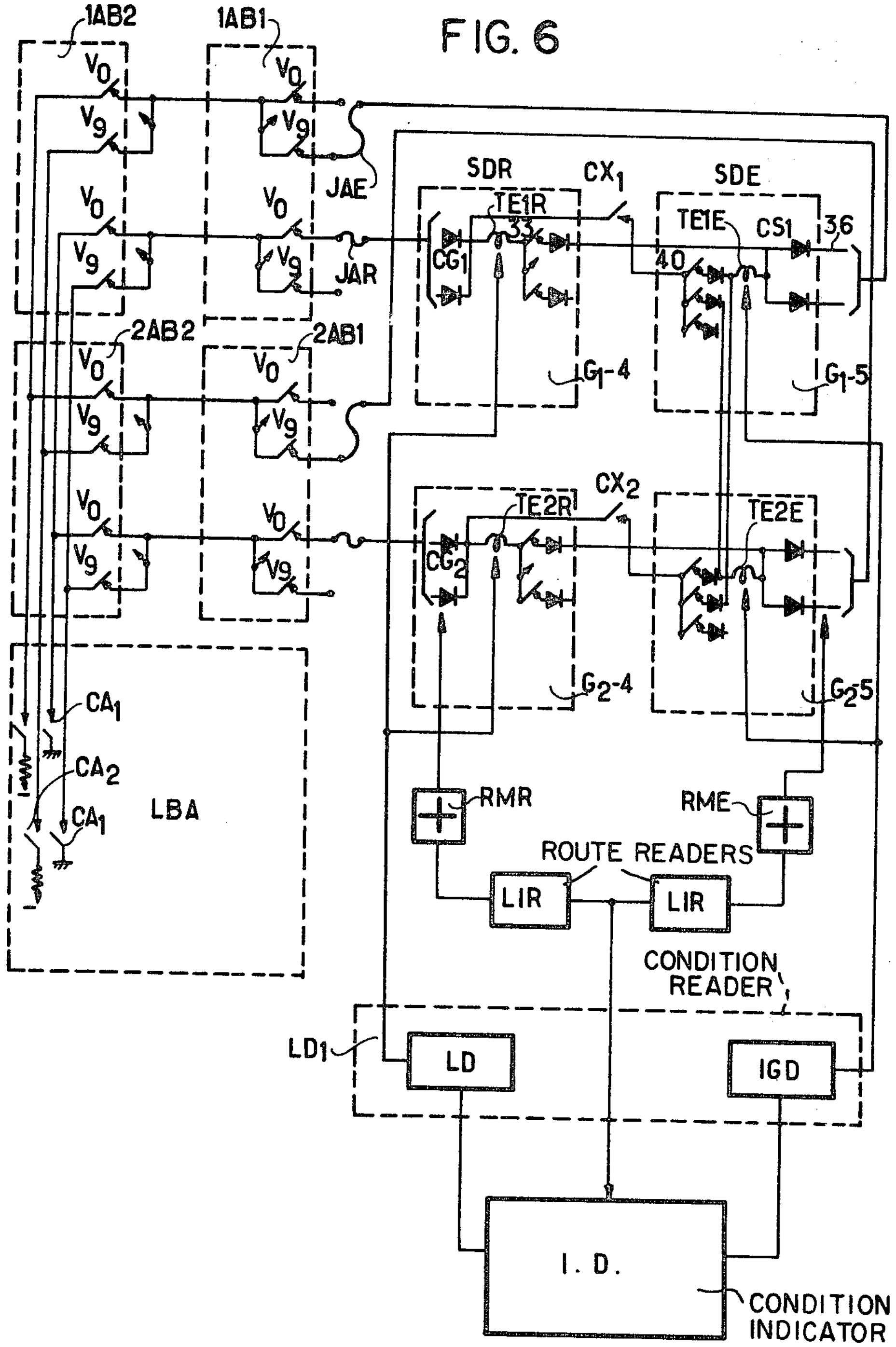
FIG. 6 is a schematical representation of a path hunting circuit comprising the selection guides.

FIG. 6 shows the principle used for hunting for a path by means of the selection guides.

1AB2 and 1AB1 constitute the first multiple of some subscribers' group, 2AB2 and 2AB1 constitute the second multiple of the same subscribers' group. In a same multiple such as 1AB2, 1AB1, are shown the resting contacts of columns V0 to V9 of bay $AB_2$ and V0 to V9 of bay $AB_1$. In each of bays $AB_2$ and $AB_1$, each column is represented by two resting contacts; the upper resting contacts of V0 to V9 of 1AB1 are connected to the called subscribers' selection stage SDE through jumper-wires JAE while the lower resting contacts of V0 to V9 of 1AB1 are connected to the calling subscribers' stage SDR through jumper wires JAR. Thus, a same column may indicate its condition when used either for calling or called purposes. The calling subscribers' selection stage SDR may comprise one or several calling subscribers' selection groups, each selection group comprising a certain number of sub-groups $G_1$4, $G_2$4, etc. The same applies for called subscribers' stage SDE. The selection guides between stages SDR and SDE are represented in greater detail in FIG. 5, which has been described above. The cores such as TE1R, TE2R . . . are read on the calling side by a condition reader LD; the cores such as TE1E, TE2E . . . are read on the called side by a called sub-group indicator IGD (LD and IGD constituting the reader LD1 described in connection with FIG. 4). The selection guides of the various calling subscribers' sub-groups may be transferred through multiple relays RMR to a route reader LIR which indicates the free route to be followed in the calling subscribers' sub-group; and in like manner for the free route to be followed in the called subscribers' sub-group through RME and LIE.

When a core has been triggered, the called subscribers' sub-group IGD located in selection bay $GS_1$ will store this item of information. Upon knowing the called subscriber's sub-group, selection bay $GS_1$ warns the routing indicator IA which had connected itself to it. The indicator then cuts the supply to the selection guides. Thus, within a selection bay selected by the condition indicator ID, a calling subscriber's selection sub-group and a called subscriber's selection sub-group have been designated to put the call through. In the selection bay, the 20 selection guides relating to the calling subscribers' sub-group and the 20 selection guides relating to the called subscribers' sub-group are then respectively transferred through multiple relays RMR and RME towards a calling route reader LIR and a called route reader LIE. Once the transfers are effected, the selection bay calls back the condition indicator ID through the routing indicator IA.

As previously, the condition indicator will operate through wire 27 the relay CA which, itself, will operate the selection guide relay $CA_1$ and $CA_2$ (FIG. 4).

Once the calling and called route readers LIR and LIE have finished their reading operations, the supply to the selection guides is cut and the condition reader ID is released.

On the basis of the reading performed, it is possible to control the positioning of the rows of calling and called selectors. It only remains, therefore, to set up the connection of the columns in the selection bay and to extend that connection to the columns of the calling and called subscribers' bays.

The register is obviously informed that such a connection has been set up by the subscribers' bay and it releases the preselection chain. The two subscribers being connected up, the call is under the control of the supply bridge inserted between calling subscribers' selector and called subscribers' selector of the selection bay.

Figure 7:
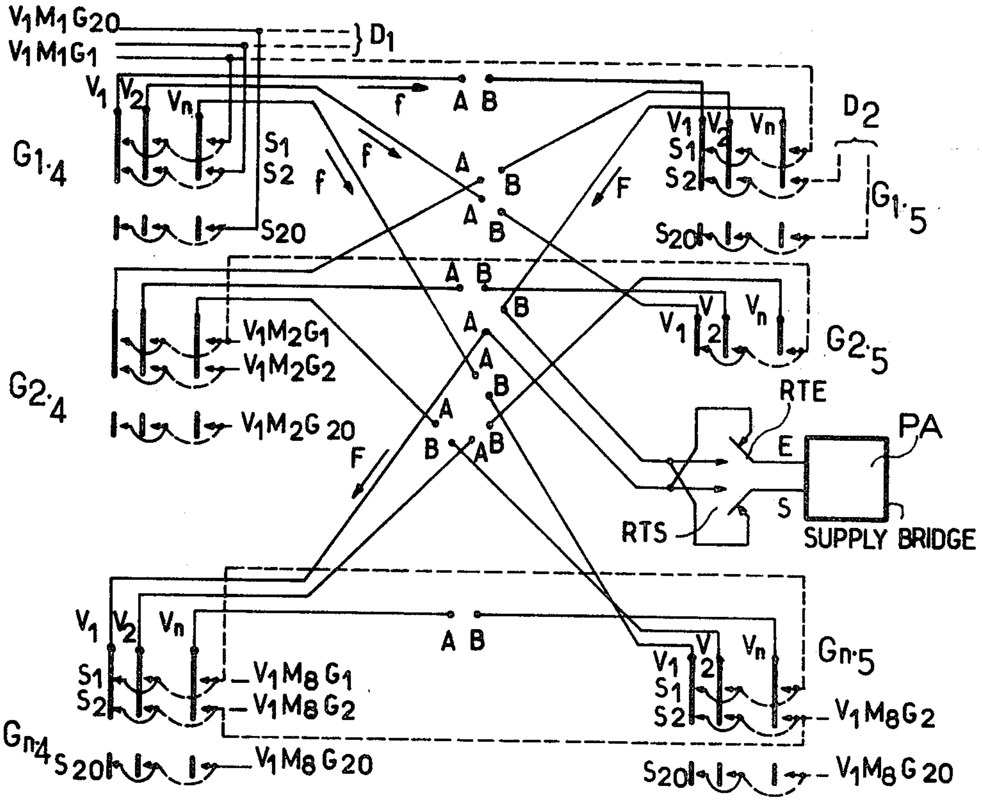
FIG. 7 shows another embodiment of an interconnection arrangement such as that of FIG. 2 but enabling bidirectional connection between calling and called subscribers' selection stages.

FIG. 7 shows the principle of the utilization of certain free connections in the opposite direction to the normal direction between a calling subscribers' selection stage and a called subscribers' selection stage. The switches are preferably of the CROSSBAR type, each switch comprising a certain number of inputs or columns and outputs or rows, the ouput being placed crosswise over the inputs. Generally, the whole of the subscribers is divided into subscribers' groups of fixed capacity, a group being made up of several selection multiples. The supply bridge for the call is located between the calling and called subscribers' selection stages, i.e. in the centre point of the calling-to-called subscribers' connection.

In the arrangement shown in FIG. 7, a selection group comprises *n* calling subscribers' sub-groups $G_1$4, $G_2$4 . . . $G_n$4 and *n* called subscribers' sub-groups $G_1$5, $G_2$5 . . . $G_n$5. Each column of a calling sub-group is connected to a column of the various called sub-groups; thus, in the sub-group $G_1$4, the column $V_1$ is connected to the column $V_1$ of sub-group $G_1$–5, the column $V_2$ is connected to the column $V_1$ of the sub-group $G_2$5 . . . etc., and the column $V_n$ is connected to the column $V_1$ of the sub-group $G_n$5. The same holds true in respect of the other calling sub-groups $G_2$–4—$G_n$–4. In addition, the outputs of the sub-group $G_1$–4 are connected respectively to the columns $V_1$ of the multiples $M_1$ of the various subscribers' groups. The setup is exactly the same for the corresponding called subscribers' group $G_1$5 so that the horizontal outputs of stage 4 are multiplied with the corresponding horizontal outputs of stage 5. This multiple is made in fact in the distribution frame $RI_1$ wherein groups $O_1$, $O_2$ of FIG. 7 are connected. As a result, virtually, the outputs $S_1$, $S_2$ . . . of sub-groups $G_1$4 are connected to the corresponding outputs $S_1$, $S_2$ . . . of sub-groups $G_1$5, which is shown in dotted line. Actually, due to the multiples between the outputs of same level when two corresponding switches setup a connection through them, the outputs of same level in both switches are not usable. Only one supply bridge PA, connected to the terminals AB, has been shown, but each of the connections has its own supply bridge.

Let it now be assumed that only one column ($V_1$ for instance in multiple $M_1$ of group $G_1$, which read $V_1M_1G_1$ is available for the calling subscriber and that only one column, in multiple 8 of group $G_2$, which reads $V_1M_8G_2$ is available for the called subscriber. The column $V_1M_1G_1$ leads to the multipled outputs 1 of sub-groups $G_1$4, but as all the connections in the direction of the arrow *f* (caller towards called subscriber) between said sub-group $G_1$4 and the various called sub-groups $G_1$5, $G_2$5 and $G_n$5 are busy, the operation is by all appearance blocked and the call cannot flow through $G_n$5 towards the called subscriber.

To cope with this difficulty, let it be assumed that there is a free circuit between the corresponding called sub-group to the calling sub-group, i.e. $G_1$5 and the corresponding calling sub-group to the called sub-group, i.e. $G_n$4; in such a case, the circuit connects the column $V_1$ of $G_n$4 to the column $V_n$ of $G_1$5. It is seen that, taking into account the multiples in dotted line, which have been accounted for above, there is a possible path between the calling column $V_1M_1G_1$ (sub-group $G_1$4) and the called column $V_1M_8G_2$ ($G_n$5) through-connection in dotted line $V_1M_1G_1$ to output 1 of $G_1$5, then from column $V_n$ to $G_1$5 to column $V_1$ of $G_n$4 in the direction of arrow *f*, then multipled outputs 2 of $G_n$4 and connection in dotted line to the multiplied outputs 2 of $G_n$5. It is, however, to be noted that the direction of the flow results in connecting the supply bridge in reversing its terminals A and B, which is not proper. In such a case, the input E and the output S of the supply bridge PA need be reversed. Routing contacts RTE and RTS controlled by a relay enable to effect such a reversal in such cases. That arrangement according to the invention enables to double to a maximum the paths between caller and called subscribers and results, consequently, in improving the selection group output.

Such an improvement obviously holds good only for local calls and for double purpose circuits.

Figure 8:
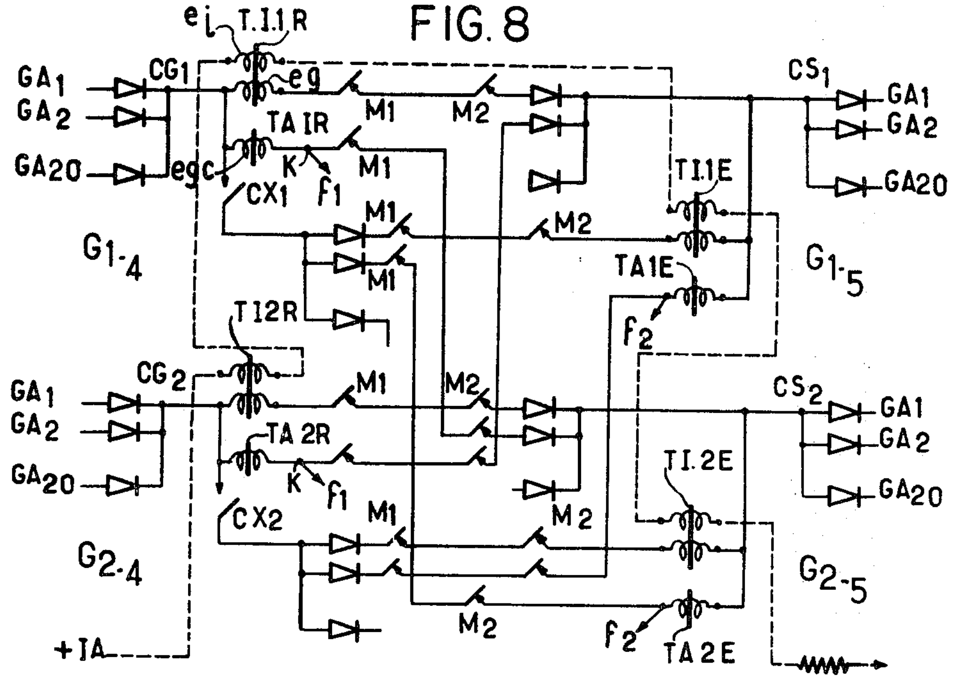
FIG. 8 is a partial representation circuit of the selection guides between two calling selection sub-group and two called selection sub-groups.

The arrangement shown schematically in FIG. 8 shows how it is possible to give or not, as the case may be, access to certain paths represented by the selection guides.

The selection guides connecting two calling selection sub-groups $G_14$ and $G_24$ to two called selection sub-groups $G_15$ and $G_25$ all belonging to the same selection group are shown in FIG. 8. The connections towards the twenty subscribers' groups of the central $GA_1$, $GA_2$ . . . $GA_{20}$ and originating from homologous columns and homologous multiples, for instance columns $V_1$ of multiples $M_1$ meet at point $CG_1$; in like manner, at point $CG_2$, but the connections originate from columns $V_1$ of multiples $M_2$ of the twenty subscribers' group. Point $CS_1$ is the common point of the incoming calls towards the called subscriber towards the columns $V_1$ of multiples $M_1$ of all the subscribers' groups, but as each column of the subscribers' groups may be used for calling or called purposes, it is provided with two resting contacts, normally closed and susceptible to open when the column is used either for calling or for called purposes. A selection group obviously includes more than two sub-groups of FIG. 1 is only a partial view of the connections.

Figure 9:
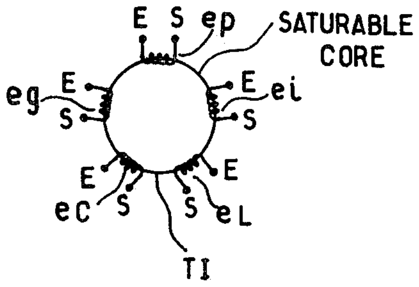
FIG. 9 shows schematically a no-access core used in the arrangement shown in FIG. 1.

FIG. 9 shows a "no access" core TI with its five windings:

a bias winding *ep*
a selection guide winding *eg*
a "no access" winding *ei,*
a control winding *ec*
a reading winding *e*L A normal core TA differs from the "no-access" core TI in that it does not include any "no access' winding.

Each calling subscribers' selection sub-group such as $G_14$ is provided with two cores including several windings: a "no access" core TI1R and a "free access" core TA1R; for each called selection sub-group such as $G_15$ the arrangement is identical, the "no access" core being TI1E and the "free access" core TA1E. A "no access" core such as TI1R differs from a "free access" normal core such as TA1R in that it includes an additional "no access" winding $e_i$, which, when energized, gives ampere-turns of opposite direction to winding $e_g$ of the selection guide and, therefore, cancels the effect of the latter. A normal "free access" core such as TA1R is not provided with any "no access" core. The winding $e_g$ of the "no access" core TI1R includes only one connection through the resting contacts of columns $M_1$ and $M_2$ towards the bifurcation point $CS_1$ of the columns towards all the subscribers' groups corresponding columns. On the contrary, the winding $e_{gc}$ of the "free access" core includes a mutual bifurcation point K from which the connections of the calling sub-group $G_14$ towards the various called sub-groups of the same selection group are effected; one of these connections is shown towards the sub-group $G_25$; the other connections are symbolized by the arrow $f_1$. It is seen that the winding $e_g$ of the core TI1R controls only the only connection from one vertical to another between the calling sub-group $G_14$ and its called corresponding $G_15$. The same applies as regards all the other calling and called corresponding sub-groups. A connecting point $CX_1$ enables to connect simultaneously point $CG_1$ of the calling sub-group $G_14$ to the corresponding called "no access" core TI1E and to all the "free access" cores such as TA2E, TA3E, etc. of the same group. For each calling sub-group, the same applies as regards the "called" cores, and the arrows $f_2$ symbolize such connections to the various calling sub-groups. The "no access" windings $e_i$ of the same selection group are all connected in series with each other; a free end finds locally a polarity (negative for instance), while the other polarity (positive in such a case) is provided in due time by a routing indicator IA, which knows the items of information determining the supply or the no-supply of the "no access" cores (circuit shown in dotted line in FIG. 8). The object of the arrangement which has just been described is to avoid the setting up of a connection between two subscribers belonging to the same subscribers' group when the connection between calling subscriber's selection sub-group and called subscribers' selection sub-group is effected through the two corresponding sub-groups; in such a case, on both the calling and the called sides, the connection ends at the same column $AB_1$ of the subscribers' groups and, consequently, the supply-bridge which is short-circuited renders the call impossible. When two subscribers belonging to the same subscribers' group wish to come into contact, the routing indicator closes all the abortive paths by operating the "no access" windings. In such a case, the cancellation of the ampere-turns provided by the windings $e_i$ and $e_g$ prevents the magnetic circuit of the corresponding core from changing state; on the contrary, the other paths which represent connections between non-corresponding calling and called sub-groups remain possible and are detected by the "free access" core TA belonging to the same sub-group as the "no access" core which was operated. Let it be assumed, for instance, that a calling subscriber of group $GA_1$ extends a call to the selection sub-group $G_14$ and wishes to come into contact with another subscribed of the same group $GA_1$. In such a case, the routing indicator energizes the "no access" windings $e_i$ and, following the cancellation of the ampere-turns, the core TI1R is ineffective; on the other hand, the core TA1R is energized if there exists a free way between the selection sub-group $G_14$ and anyone of the called sub-groups $G_25$–$G_35$–$G_n5$ (except for the corresponding $G_15$ of the former).

If the calling subscriber of group $GA_1$ wishes to come into contact with a subscriber of a group other than $GA_1$, as the "no access" winding of the core TI1R is not energized, said core behaves as a normal core and if the path which goes through the winding $e_g$ of the core TI1R is free, said path can be detected and taken. If the path is not free, the core TA1R enables to detect another one amongst the other connections of the sub-group $G_14$ with the called sub-groups. To know the called sub-group which has a free path towards the called subscriber, a quick-operating relay is energized to make the contact $CX_1$; one of the cores TI1E, TA2, TA3E, TA*n*E may undergo a change of state and thus indicate the called sub-group having a free path towards the called subscriber. The calling and called subscribers' selection sub-groups through which runs a free path for connecting the two subscribers are known in this way.

Figure 10:
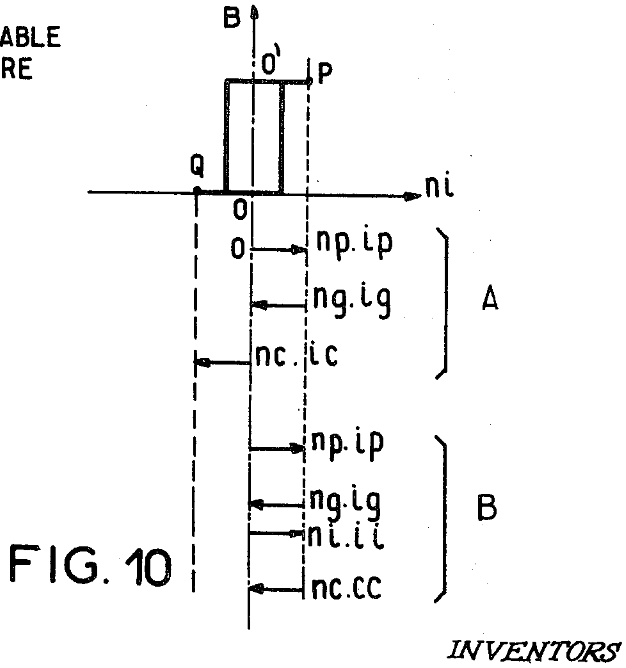
FIG. 10 shows the operating diagram in the case of a normal magnetic core (Part A) and in the case of a no-access core (Part B)

FIG. 10 shows the hysteresis curve of the magnetic material of a core. The induction B is given as a function of the ampere-turns *ni.*

Part A of FIG. 10 shows how the sum of the ampere-turns of the various windings (bias *np.ip,* selection guide *ng.ig* and control *nc.ic* windings) brings the magnetic core successively from state 0 to state 1, then from state 1 to state 0. The reading winding $e_l$ carries an induced current detected when the core passes from state 1 to state 0. This is the case of a normal core TA.

Part B of FIG. 8 shows the sum of the ampere-turns provided by the various windings in the case of the "no access" core according to the invention. It is seen that here, the core, which was at state 0 is brought to state 1 and remains at state 1 even under the effect of the control ampere-turns *nc.ic.* As a result, there is no induced current in the reading winding and, consequently, the prohibited free access is not signalled.

It has already been mentioned that a "no access" core, TI1R for instance, comprises an additional winding, $e_i$ as compared with the normal core TA1R; a normal core TA1R has four windings: a bias winding *ep* which brings the core to state 1, a winding *eg* of the selection guide, which gives ampere-turns *ng.ig* of opposite direction to that of those *np.ip* of the bias winding but the effect of which is not sufficient to change state 1 of the core, a control winding *ec* producing ampere-turns *nc.ic* also of opposite direction to those of the bias winding, which cannot by themselves vary the state 1 of the core but which, when added to the ampere-turns of the winding of the selection guide, trigger the core to state 0. An induced current is thus initiated in the reading winding $e_L$ and enables the signalling of the core where the selection guide is fed, i.e. where there is a free path. The "no access" core TI1R operates similarly to the core TA1R when there is no inhibiting factor; if there is an inhibiting factor, the ampere-turns *ng.ig* supplied by the selection guide winding *eg* are strictly cancelled by those *ni.ii* of the "no access" winding *ei*. The core therefore remains at state 1 brought by the bias winding. When the control current is sent into the corresponding winding, the ampere-turns are not adequate to trigger the core which remains at state 1 and no pulse is produced in the reading winding. All happens just as if the explored path was busy.

Figure 11:
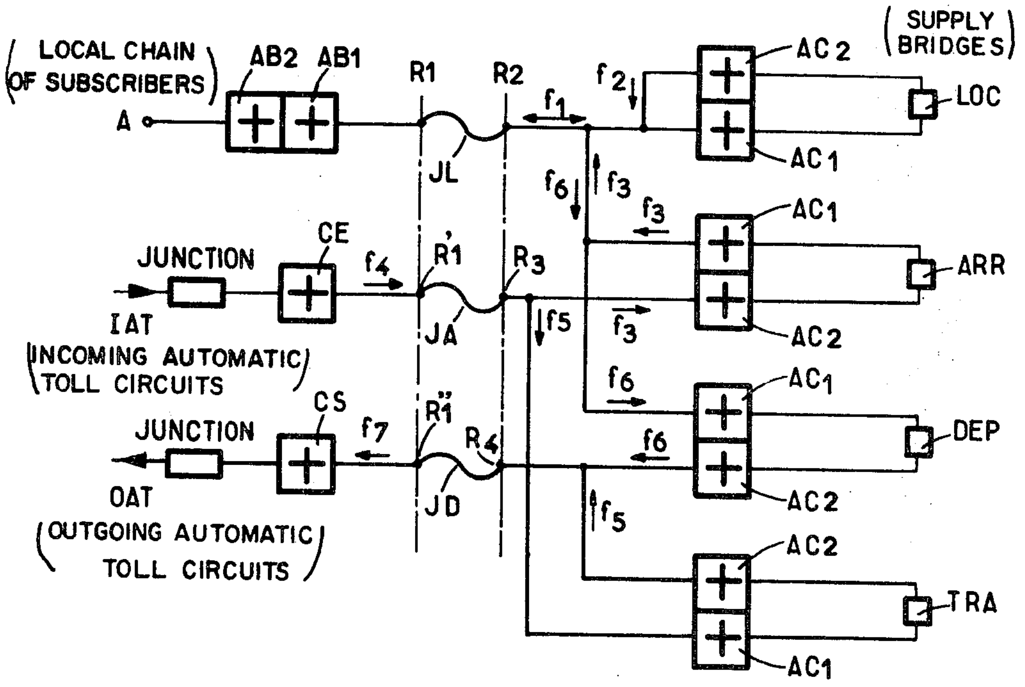
FIG. 11 shows a diagram similar to that of FIG. 3 of a central office including an automatic toll chain.

FIG. 11 shows the diagram, according to the invention, of the main selection chains; as in the diagram according to FIG. 3, only the traffic circuits are shown, all the auxiliary circuits which prepare the call are not being shown.

There are three main selection chains: the local chain of subscribers A, the chain of the incoming automatic toll circuits IAT and the chain of the outgoing automatic toll circuits OAT.

In connection with FIG. 7, it has been mentioned that the connections between the calling selection side and the called selection side are not necessarily set up on the caller-to-called subscriber direction; more particularly, when all the connections in the caller-to-called subscriber direction are unavailable, it is possible to set up a connection in the called subscriber-to-caller direction serving the same purpose but provided that the supply bridge be reversed in the new connection. In other words, either direction may equally be used provided that the supply bridge be branched conveniently.

Taking this into account, the incoming circuits are connected on the incoming selection side, like the outgoing circuits. The automatic toll incoming circuits IATA pass through a distribution frame JA between points R'1 and R3 and are connected on the called selection side AC2; the outgoing automatic toll circuits OAT pass through a distribution frame JD between points R"1 and R4 and are also connected on the called selection side AC2. But a special supply bridge ARR is reserved for the incoming circuits while a special supply bridge DEP is reserved for the outgoing circuits.

The incoming and outgoing circuits are therefore connected towards the local subscribers in a similar manner through the called and calling selection stages.

As regards the through traffic circuits, the calling circuit AIA is connected on the calling subscribers' selection stage AC1, while the outgoing circuit OAT is connected on the called subscribers' selection side AC2. The setting up of the subscribers selection sub-groups on side R2 of the distribution frame is mutual to the incoming circuits ARR and the outgoing circuits DEP.

If $f_1$ denotes the subscribers' total traffic, $f_2$ the local traffic between subscribers, $f_3$ the incoming traffic towards the subscribers and $f_6$ the outgoing traffic from the subscribers, it may be asserted that $f_1=f_2+f_3+f_6$. In a similar manner, for the total incoming traffic $f_4$ of the incoming automatic toll circuits IAT, where $f_5$ represents the through traffic, it may be asserted that $f_4=f_3+f_5$.

In a similar way, if $f_7$ is the total outgoing traffic handled by the automatic toll circuits OAT, $f_7=f_5+f_6$.

An obvious advantage of such an arrangement is that the same multiple of the selection groups of the distribution frame in R2 is used for the local subscribers fed by the bridges LOC, for the incoming calls fed by the bridges ARR and for the outgoing calls fed by the bridges DEP. Similarly, the multiple of the incoming circuit IAT is used in R3 for the incoming calls and for the through calls, and the multiple of the outgoing circuits OAT is used in R4 for the outgoing calls and for the through calls.

The arrangement according to the invention therefore simplifies to a great extent the distribution frame as compared to what is known according to FIG. 3.

Figure 12:
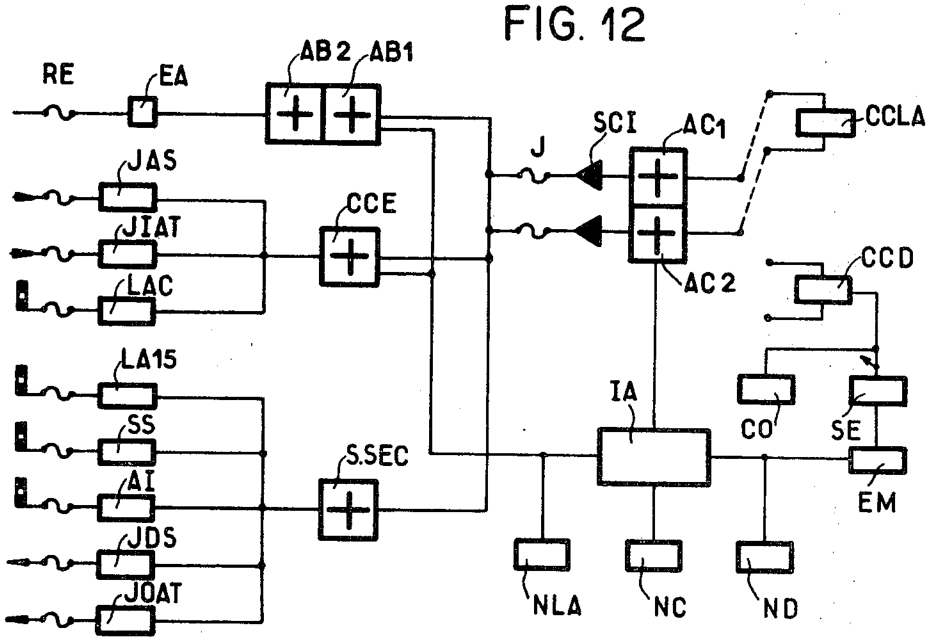
FIG. 12 is another representation of the central office showing the details of control arrangement for the selection stages $AC_1$ and $AC_2$ of FIG. 11.

In FIG. 12, not only the diagram of the main traffic connections are shown, but also the essential connections for preparing the call. The sign SCI (solid triangle) means that the selection is of the "integral conjugate selection" type, i.e. that following the receipt of the called subscriber's number, the selection is undertaken only once it is certain that a free path exists between the calling and called subscribers.

The local chain comprises, from the input distribution frame RE, the subscribers' equipments EA, the subscribers' groups AB2 and AB1 where the calling subscriber is, an intermediate distribution frame J, a calling subscribers' selection stage AC1 connected to a called subscribers' selection stage AC2 through a local connection circuit CCLA, then the subscribers' groups AB1 and AB2 where the called subscriber is located.

The incoming chain comprises, after the input distribution frame RE, all the lines and circuits which are "calling" in the central office, such as the incoming satellite junction devices JAS, the incoming automatic toll junction devices JIAT and the keyboard call lines LAC. An incoming circuit selector CCE plays with respect to the circuits making up the incoming chain a similar part to that of the subscribers' groups AB2–AB1 which are "calling" with regard to the subscribers' equipments EA. The incoming circuits may wish to set up an incoming call towards the local subscribers and then proceed towards the selection stages AC2–AC1 through the incoming connection circuits CCLA, or they may wish to set up a through call towards the outgoing circuits and then pass through the selection stages AC2–AC1, the secondary selectors SSEC and the outgoing automatic toll junction devices JDIA.

The outgoing chain comprises, after the input distribution frame RE, all the lines and circuits which are "called" in the central office such as the calling lines of 15, LA 15, special services, SS, automatic interphone AI, outgoing call junction devices towards the satellites JDS, outgoing call junction devices towards automatic toll circuits JOAT . . . the calls are set up either from the subscribers, or from the incoming circuits and pass, in any case, through the selection stages AC1 and AC2 and through the secondary selector SSEC, the stages AC1 and AC2 being connected to each other through the outgoing connecting circuits CCD. The connecting circuits CCLA and CCD are connected by fixed connections to the inputs of the selection stages AC2, AC1 as shown in FIG. 11.

The essential component for preparing the call is the routing indicator IA, which is connected to the subscribers' groups AB1, AB2, to the circuit bays CCE, to the selection groups AC2, AC1 and to various auxiliary components such as the central notifier NC, the local call transfer notifier NLA, the outgoing call transfer notifier ND, the emitter EM, etc. in order to fully control the setting up of the call, from the transfer of the subscriber's number up to the connection of the supply bridge in the case of a local call, and up to the transmission of the subscriber's number towards a distant central office in the case of an outgoing call. As regards outgoing calls, after releasing the emitter EM, a supervision device SE waits for the distant central office selection clearing signal; a counting arrangement CO is associated to the outgoing connection circuit CCD. In the type of diagram according to FIG. 3, the central office comprises subscribers' lines and circuits; the diagram would also be good for smaller or bigger central offices.

Figure 13:
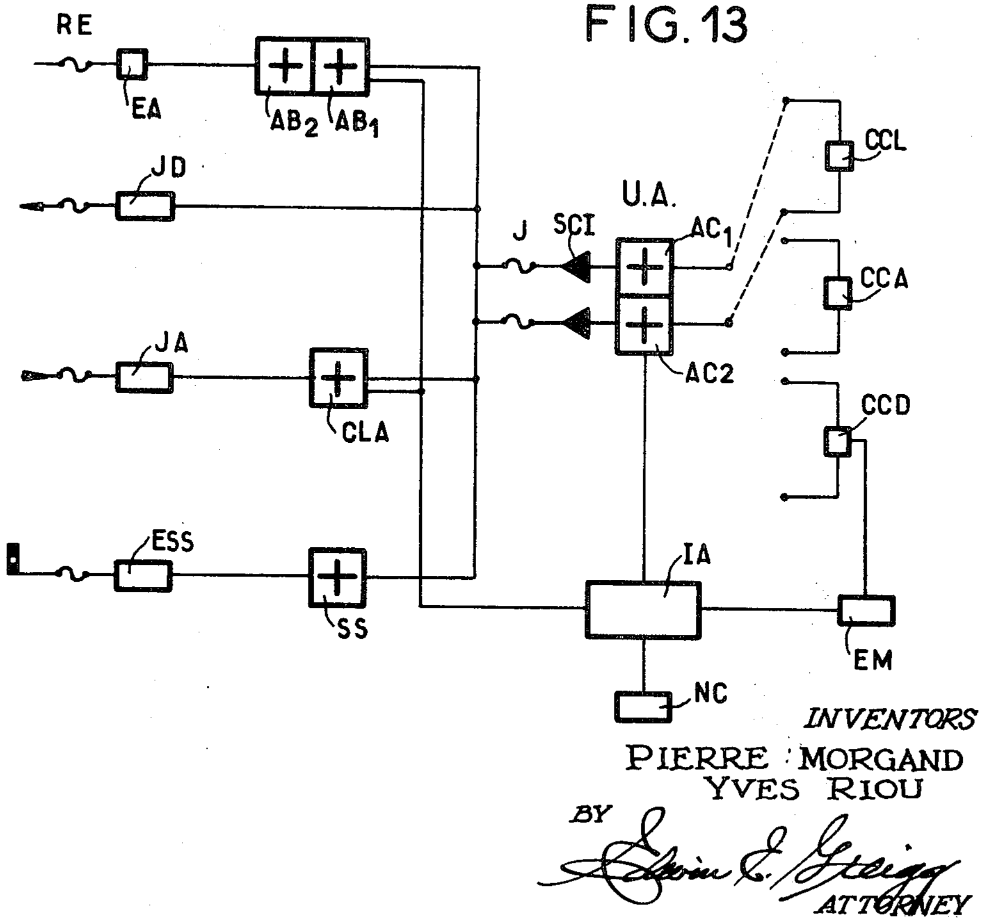
FIG. 13 shows another way of representing the arrangement according to FIG. 11, the automatic toll part being a tandem unit distinct from the local part.

Now, as concerns networks comprising several local central offices, the trunk part is centralized in a specialized central office so called "tandem center." The latter is connected to each local central office through junctions utilized in the incoming or outgoing directions. FIG. 13 shows the diagram of such a local central office with the essential connections for preparing the call. The sign SCI (solid triangle) has the same meaning as that given in connection with FIG. 12. The main difference between this diagram according to FIG. 13 and the diagram according to FIG. 14 lies in the connection of the outgoing junction devices JD, the incoming junction devices JA and special services. The incoming line selectors CLA are found between the incoming junction devices JA and the routing units UA of the selection stages, while the large bunches of outgoing junction devices are directly connected to the routing units. The distribution of the special services is effected through the secondary selectors SS connected to the special services equipments ESS. In FIG. 13 the incoming connecting circuit CCLA has been divided in a local connecting circuit CCL and an incoming connecting circuit CCA.

FIGS. 12 and 13 are only a different mode of representation of the invention from that of FIG. 11.

Figure 14:
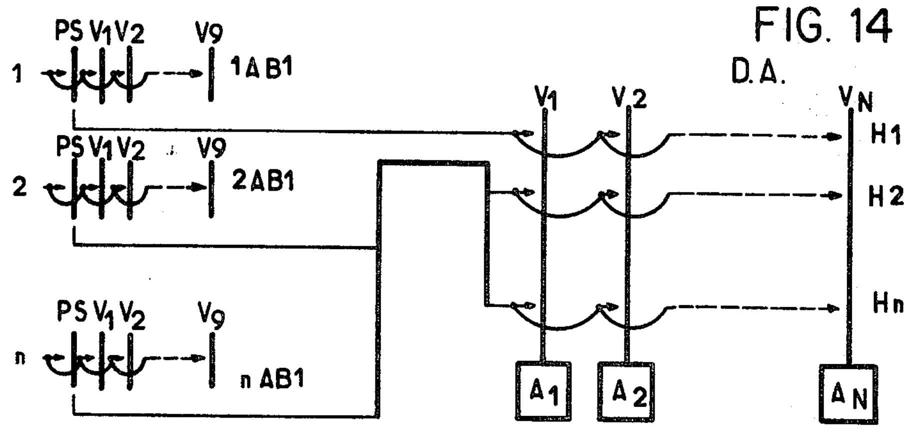
FIG. 14 shows schematically the distribution of recording devices in a subscribers' group.

In FIG. 14, the multiples such as 1 (circled) of the switch 1 $AB_1$ of the first selection multiple lead respectively to the different columns of the switch 1 $AB_2$ (not shown), the rows of which are connected to the subscribers; likewise, the multiples such as 2 (circled) of the switch 2 $AB_1$ of the second selection multiple lead to the different columns of the switch 2 $AB_2$, etc., and the multiples such as $n$ (circled) of the switch $n$ $AB_1$ lead to the different columns of the switch $n$ $AB_2$. In each switch 1 $AB_1$, 2 $AB_1$ . . . $n$ $AB_1$, a column PS is reserved for pre-selection: thus, the column PS of the switch 1 $AB_1$ is connected to the first horizontal multiple $H_1$ of the recording unit distributor DA, the column PS of the switch 2 $AB_1$ is connected to the second horizontal multiple $H_2$, etc., and the column PS of the switch $n$ $AB_1$ is connected to the $n^{th}$ horizontal multiple $H_n$ of the distributor DA. Each column of the recording unit distributor DA is connected to a recording unit, the column $V_1$ to the recording unit $A_1$, the column $V_2$ to the recording unit $A_2$ . . . the column $V_n$ to the recording unit $A_n$, so that it is possible to provide for an adequate number $n$ of recording units for the traffic, it being understood that each of the recording units may be seized by any one of the selection multiples. In this manner, there are, in the central office, as many subgroups, such as that of FIG. 14, as subscribers' groups.

Figure 15:
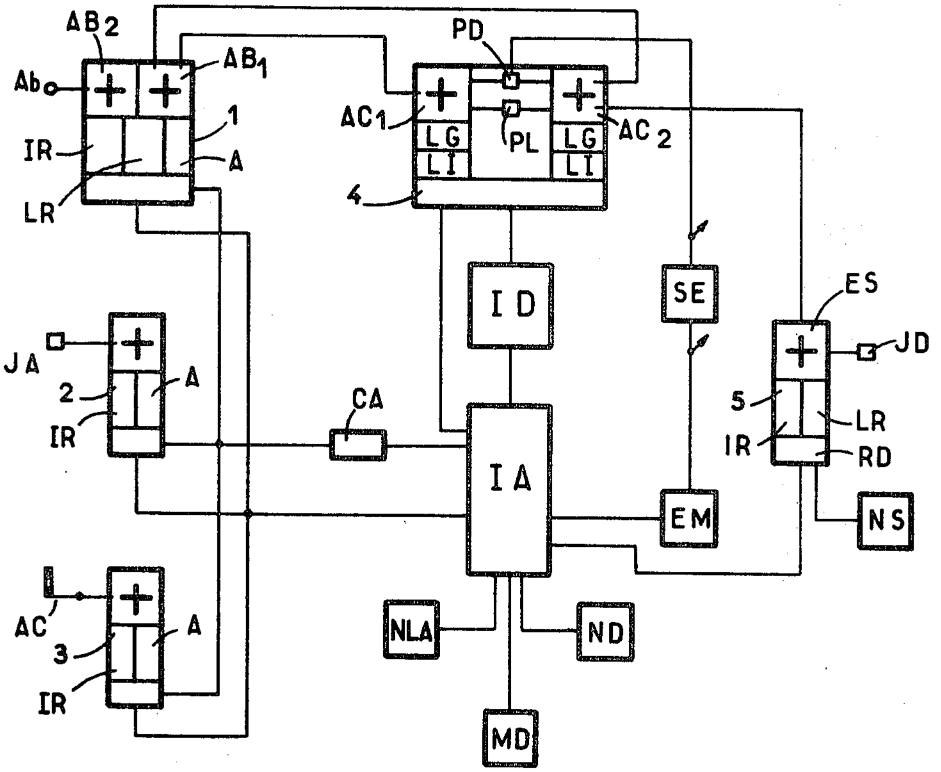
FIG. 15 shows a diagram of a central office according to the invention.

In FIG. 15, the subscribers' bays 1, the incoming automatic circuit bays 2, the manual-operated incoming circuit bays (keyboard call) 3 may be connected to the routing indicator IA through a call connecting device CA to inform it of the subscriber's number previously received in a recording unit A belonging to one of the bays 1, 2 or 3. Each subscribers' bay, such as 1 comprises several selection multiples, each multiple comprising a switch $AB_1$ associated with one or two switches $AB_2$ to which are connected the subscribers' equipments A*b*, a sub-group A of recording units, an identifier IR enabling one to connect the caller to a recording unit, and a reader LR enabling one to know the called subscriber's condition (free, busy, discriminated). The incoming circuit bay 2 and the manual calling line bay 3 are also provided with an identifier IR and a sub-group of recording units A having the same functions as for the subscribers' bay 1. The incoming call junction devices JA are connected to the rows of switches of the incoming circuit bay 2, and the manual calling lines AC are connected to the rows of switches of bay 3. The central selection stage 4 is made up of calling subscribers' selection stages $AC_1$ and called subscribers' selection stages $AC_2$, the local call supply-bridges PL and the outgoing call supply-bridges PD being inserted on the cables connecting $AC_1$ and $AC_2$. In addition, sub-group readers LG, the task of which is to indicate the sub-group where a free path is free, and route readers LI indicating, within the sub-group, the free route to be followed are associated with each of the selection groups $AC_1$ or $AC_2$. The outgoing circuit bay 5, also called secondary bay, comprises switches ES giving access to the outgoing call junction devices JD through their horizontal lines, an identifier IR, the task of which is to identify the calling column, and a reader LR having as function the positioning of the horizontal lines of the secondary stage. The routing indicator IA is connected to the condition indicator ID (or central notifier) and the latter is itself connected to the calling and called subscribers' selecting stage, as described earlier in the description. In addition, the routing indicator IA is connected to each calling subscribers' selection group $AC_1$, to each emitter EM and to a set of directional relays RD. An incoming and local call transfer notifier NLA is associated with the routing indicator in order to enable the called subscriber's number to be transferred from the calling subscribers' bay to the routing indicator and, from the latter, to the called subscribers' bay in the case of an incoming or local call, and an outgoing call transfer notifier ND enables the called subscriber's number to be transferred to the emitter EM, in the case of an outgoing call. Lastly, a time-lag storage means MD may also be associated with the routing indicator IA in case all the connections should be busy, for a moment, in the selection stage 4. A supervision arrangement SE is inserted between the outgoing call bridge PD and the emitter EM in the case of an outgoing call.

By way of example, it will now be explained how a local call and an outgoing call are set up, taking into account the novel arrangement of the components in the central office, according to the above-described embodiment of the invention.

Local call

The subscriber's number is recorded in a recording unit A, it being understood that the object of the identifier is to connect the calling line to a free recording unit, that a column PS of each switch $AB_1$ is specially reserved for such an operation, and that the latter is performed in a similar manner to that described in French Pat. No. 1,326,463 of March 26, 1962. The recording unit calls the subscribers' bay 1 (following the receipt of the called subscriber's full number), which itself calls the routing indicator IA through the call connecting device CA, the object of which is to supervise the distribution of the calls from the various bays towards the routing indicator. The called subscriber's number is then transferred to the routing indicator under the supervision of the notifier NLA; the routing indicator analyses the number and infers from that the number of the subscribers' group of the called subscriber. The routing indicator calls a local call transfer notifier NLA, which authorizes to perform it if there is a free way. The reader LR of the subscribers' group of the called subscriber, which knows the number of the latter, can find its condition (free, busy or discriminated) and transfers these indications to the routing indicator IA. If the subscriber is free, the routing indicator contacts the condition indicator and the remaining operations are performed as described earlier in the description. The last part of the connection is effected by the routing indicator through the selection group. The recording unit is released when the supply bridge PL is connected.

Outgoing call

In the same manner as for the setting up of a local call, following the transfer of the called subscriber's number into the routing indicator IA, under the supervision of the notifier NLA, the routing indicator ascertains whether there is a free circuit in the set of circuits of the called direction. To this end, the routing indicator connects itself to the sets of directional relays RD serving the desired circuits. The routing indicator IA calls the condition indicator ID to authorize it to mark the selection guides. The latter are then fed at both ends, i.e. on the one part, from the subscribers' group of the calling subscriber and, on the other hand, from the outgoing junction devices JD. The readers indicating the calling sub-groups in which there exists a free way to set up, the call then gets into contact with the condition indicator ID, which connects itself with the reader which has first contacted it. The condition indicator is thus in a position to inform the routing indicator of the selection group in which there exists a free path to set up the call, then the routing indicator connects itself to said selection group.

Now is the time to initiate the hunting for the called subscribers' selection sub-group having a free path towards the called subscriber; when such a sub-group is found, the routing indicator releases the condition indicator ID but remains connected with the selection group. When both the calling subscribers' selection sub-group and the called subscribers' selection sub-group are known, the supply-bridge to be used in known.

The routing indicator then operates to call, through the supply-bridge, a call supervision device and an emitter; when the emitter is thus connected to the supply-bridge, the routing indicator is so informed. At that moment, and if the outgoing call transfer notifier ND allows it, the digits of the called subscriber's number are transferred from the routing indicator to the selected emitter, through the layer of the outgoing call transfer cables.

The routing indicator then controls the secondary selection through the outgoing call supply connection and the associated column $AC_2$ of the called subscribers' selection sub-groups. This is achieved as follows: a calling polarity is applied by the routing indicator to a line wire of the supply-bridge; being carried by the column $AC_2$ which has been triggered, said polarity causes in the secondary bay 5 the identification of the secondary column to which the connection has been effected through $AC_2$. When that operation is over, the secondary identifier IR connects itself to a secondary reader LR, the connection of which is signalled to the routing indicator by a polarity applied to the second line wire. Subsequently, the secondary reader calls a secondary notifier NS which authorizes to read the outgoing call selection guides. Once the selection of a free way is over, the secondary reader connects the secondary column, so informs the routing indicator and is released.

The routing indicator initiates the connection of the column $AC_1$ and the connection is extended to the columns $AB_1$ and $AB_2$ of the subscribers' group of the caller. The bridge is then connected; continuity is thus achieved between the caller and the outgoing call bridge, between the outgoing call bridge PD and the emitter EM and also between the emitter and the outgoing call junction devices JD. The routing indicator is released.

The call remains under the supervision of the emitter EM; the latter emits the digits of the called number towards the distant central office and is released.

The call is then placed under the supervision of the calling subscriber and associated supervision device SE. The latter waits for the end-of-selection signal.

(1) If the called subscriber is free, it connects the bridge for good, which results in achieving the continuity of the call wires between the calling subscriber and the outgoing call bridge.

(2) If the called subscriber is busy, it releases the bridge and the existing chain, and the called subscriber is known to be busy.

At the end of either one of these operations, the supervision device is released.

It may happen that, between the instant when a free path is found between calling and called subscribers and the instant when the routing indicator blocks the selected selection group, the only free path has been taken and the circuits are saturated. In such a case, the routing indicator transfers the called subscriber's number to a time-delay storage means MD and deals with another call before trying again and recalling the calling subscriber.

Another utilization case may be easily rendered possible by intermittent discrimination of the called subscriber: if the latter so wishes, the discrimination which then covers the called subscriber indicates that he must be called using another number than his normal number. That secondary number may obviously be stored in a central storage means and used according to the called subscriber's requirements by any convenient means, either automatic or not.

It is evident that various modifications and changes may be made in the embodiment of the invention herein illustrated and described without departing from the spirit and scope of the invention as described in the following claims.

What is claimed is:

1. An automatic telecommunication central office system comprising a plurality of switches of the type having two groups of terminals respectively designated as "columns" and "rows," including a first group of switches designated as a "subscriber group" in which each row corresponds to a line of a subscriber, a second group of switches forming a "selection stage" comprising a first group of selection switches and a second group of selection switches, each of the columns of said subscriber group being connected to at least one corresponding row of said selection stage, the rows of said first group of selection switches being further multipled with corresponding rows of said second group of selection switches, connecting means for selectively interconnecting the columns of said first group of selection switches with the columns of said second group of selection switches, including a plurality of lines each having a supply bridge, and means for constituting a reversed selection path between said first and second groups of selection switches if the direct path is in a busy state.

2. An automatic telecommunication central office system, according to claim 1 wherein each of said selection stages comprises a plurality of groups, each having a plurality of columns and a plurality of rows, the selective interconnection of the columns of the caller selection stage with the columns of the called selection stage being such that the columns of a group of the caller selection stage are connected respectively to one column of each of the groups of said called selection stage.

3. An automatic telecommunication central office system comprising a plurality of switches of the type having two groups of terminals respectively designated as "columns" and "rows," including a first group of switches designated as a "subscriber group" in which each row corresponds to the line of a subscriber, a second group of switches forming a "selection stage" comprising a first group of selection switches and a second group of selection switches, each of the columns of said subscriber group being connected to one corresponding row of said selection stage, the rows of said first group of selection switches being further multipled with corresponding rows of said second group of selection switches, and connecting means for selectively interconnecting the columns of said first group of selection switches with the columns of said second group of selection switches, including a plurality of lines each having a supply bridge inserted therein through inverter switch means, a communication in the direction "caller-called" thus being obtained, upon actuation of said switch means, by use of said connecting means normally assigned to communications in the direction "called-caller."

4. An automatic telecommunication central office system according to claim 3 comprising a plurality of links between said first and second groups of selection switches of said selection stage, said links constituting a double path between two columns of two subscriber groups, one direct path being constituted by a direct link, and one reversed path being constituted by a reversed link and two multiples between rows of the same level of respectively first and second groups of selection switches.

5. An automatic telecommunication exchange system in which subscribers are formed into groups each provided with a line switching frame on which each subscriber has a number of inlets and incorporating a group selector switching network for establishing communication between the subscriber groups, the group selector network comprising, a plurality of group selector switching frames, each frame comprising two switching stages and each said stage having the same number of switches, outlets of the switches in both stages being distributed over inlets to the subscribers line switching frame, the inlets of each switch of one stage of each group selector switching frame being connected to all the switches of the other stage of the frame, and a marking circuit for establishing a connection between any two subscribers, including means for preventing the connection established between subscribers from being made over a group selector switching frame with use of one switch in one stage of the switching frame and the corresponding switch to said one switch in the other stage of said switching frame.

6. An automatic telecommunication exchange system according to claim 5, wherein each link between switching stages of a group selector switching frame incorporates a supply bridge, each pair of outlets of corresponding switches in each group selector switch frame being connected to the same input of a subscribers line switching frame, the supply bridges in the links between the two switching stages of the group selector switching frame being reversible, so that when the group selector switching frame is blocked and a connection cannot be made across the frame in one direction, the connection is set up by working across the frame in the opposite direction.

7. An automatic telecommunication exchange system according to claim 5, in which an assembly of registers is provided for each group of subscribers, each register having as its only function the registering of the called number for transfer to a central routing indicator, the registers being connected to the subscribers line switching frame of each group, each of which subscribers line switching frames comprise a number of selector switch assemblies each providing a number of outputs to all the subscribers of the group through a register connector so that any given register has access to any one of the selector switch assemblies of the line switching frame of the subscriber group.

References Cited

UNITED STATES PATENTS

| | | | |
|---|---|---|---|
| 2,885,482 | 5/1959 | Baker. | |
| 3,272,924 | 9/1966 | Warman. | |
| 3,308,242 | 3/1967 | Erwin. | |
| 3,417,205 | 12/1968 | Warman et al. | 179—22 |
| 3,068,324 | 12/1962 | Warman. | |

WILLIAM C. COOPER, Primary Examiner